United States Patent [19]
Howard et al.

[11] Patent Number: 5,933,154
[45] Date of Patent: *Aug. 3, 1999

[54] MULTI-PANEL VIDEO DISPLAY CONTROL ADDRESSING OF INTERLEAVED FRAME BUFFERS VIA CPU ADDRESS CONVERSION

[75] Inventors: Brian D. Howard, Menlo Park; Robert L. Bailey, San Jose, both of Calif.

[73] Assignee: Apple Computer, Inc., Cupertino, Calif.

[*] Notice: This patent is subject to a terminal disclaimer.

[21] Appl. No.: 08/316,651

[22] Filed: Sep. 30, 1994

[51] Int. Cl.$^6$ ............................................. H04N 5/00
[52] U.S. Cl. ................................. 345/507; 348/839
[58] Field of Search ................... 345/185, 1, 3, 345/201, 203; 361/686; 348/839, 840

[56] References Cited

U.S. PATENT DOCUMENTS

| | | | |
|---|---|---|---|
| 4,628,467 | 12/1986 | Nishi et al. | 345/201 |
| 4,744,006 | 5/1988 | Duffield | 361/686 |
| 4,780,712 | 10/1988 | Itaya et al. | 345/201 |
| 4,980,765 | 12/1990 | Kudo et al. | 345/203 |
| 4,987,551 | 1/1991 | Garrett, Jr. | 345/185 |
| 5,018,076 | 5/1991 | Johary et al. | 345/1 |
| 5,309,168 | 5/1994 | Itoh et al. | 345/185 |
| 5,387,923 | 2/1995 | Mattison et al. | 345/103 |
| 5,422,654 | 6/1995 | Tjandrasuwita et al. | 345/3 |
| 5,428,743 | 6/1995 | Takai | 345/201 |
| 5,448,264 | 9/1995 | Pinedo et al. | 345/201 |
| 5,457,482 | 10/1995 | Rhoden et al. | 345/185 |
| 5,488,385 | 1/1996 | Singhal et al. | 345/3 |

*Primary Examiner*—Mark R. Powell
*Attorney, Agent, or Firm*—Richard C. Liu

[57] ABSTRACT

A method and an apparatus for interleaving display frame buffers for use by multi-panel display(s) is disclosed. The system provides a data addressing transformation apparatus for converting CPU addresses for pixel positions of the multiple panels of display screen(s) to corresponding memory addresses so as to enable multiple video frame buffers to be interleavably stored in and retrieved from a single video memory system.

4 Claims, 14 Drawing Sheets

640x480 x   1bt/pxl   =   38,400 bytes

640x480 x   2bts/pxl  =   76,800 bytes

640x480 x   4bts/pxl  =   153,600 bytes

640x480 x   8bts/pxl  =   307,200 bytes

640x480 x   16bts/pxl =   614,400 bytes

640x480 x   24bts/pxl =   921,600 bytes

640x480 x   32bts/pxl =   1,228,800 bytes

FIG. 1A 2 x 128Kx8   =   262,144 bytes
or   1 x 128Kx16

2 x 256Kx8   =   524,288 bytes
or   1 x 256Kx16

2 x 512Kx8   =   1,048,576 bytes
or   1 x 512Kx16

4 x 128Kx8   =   524,288 bytes
or   2 x 128Kx16

4 x 256Kx8   =   1,048,576 bytes
or   2 x 256Kx16

4 x 512Kx8   =   2,097,152 bytes
or   2 x 512Kx16

FIG. 1B

```
  640x480  x  8bts/pxl
+ 640x480 x   1 bt/pxl   =   345,600 bytes

640x480  x  8bts/pxl
+ 640x480 x   2bts/pxl   =   384,000 bytes

640x480  x  8bts/pxl
+ 640x480 x   4bts/pxl   =   460,800 bytes

640x480  x  8bts/pxl
+ 640x480 x   8bts/pxl   =   614,400 bytes

640x480  x 16bts/pxl
+ 640x480 x   1 bt/pxl   =   652,800 bytes

640x480  x 16bts/pxl
+ 640x480 x   2bts/pxl   =   691,200 bytes

640x480  x 16bts/pxl
+ 640x480 x   4bts/pxl   =   768,000 bytes

640x480  x 16bts/pxl
+ 640x480 x   8bts/pxl   =   921,600 bytes

640x480  x 16bts/pxl
+ 640x480 x 16bts/pxl    = 1,228,800 bytes

640x480  x 24bts/pxl
+ 640x480 x   1 bt/pxl   = 1,228,800 bytes

640x480  x 24bts/pxl
+ 640x480 x   2bts/pxl   = 1,228,800 bytes

640x480  x 24bts/pxl
+ 640x480 x   4bts/pxl   = 1,228,800 bytes

640x480  x 24bts/pxl
+ 640x480 x   8bts/pxl   = 1,228,800 bytes

640x480  x 24bts/pxl
+ 640x480 x 16bts/pxl    = 1,843,200 bytes

640x480  x 24bts/pxl
+ 640x480 x 24bts/pxl    = 2,457,600 bytes
```

FIG. 2

| VRAM Column Address Bits | Buffer Address Bits | | | | |
|---|---|---|---|---|---|
| 5 4 3 2 1 0 | B/A = 1<br>5 4 3 2 | B/A = 2<br>5 4 3 2 | B/A = 4<br>5 4 3 2 | B/A = 8<br>5 4 3 2 | B/A = 16<br>6 5 4 3 2 |
| 0 0 0 0 0 0 | AU 0000 | AU 0000 | AU 0000 | AU 0000 | AU 00000 |
| 0 0 0 0 0 1 | AL 0000 | AL 0000 | AL 0000 | AL 0000 | AL 00000 |
| 0 0 0 0 1 0 | BU 0000 | BU 0000 | BU 0000 | BU 0000 | BU 00000 |
| 0 0 0 0 1 1 | BL 0000 | BL 0000 | BL 0000 | BL 0000 | BL 00000 |
| 0 0 0 1 0 0 | AU 0001 | BU 0001 | BU 0001 | BU 0001 | BU 00001 |
| 0 0 0 1 0 1 | AL 0001 | BL 0001 | BL 0001 | BL 0001 | BL 00001 |
| 0 0 0 1 1 0 | BU 0001 | AU 0001 | BU 0010 | BU 0010 | BU 00010 |
| 0 0 0 1 1 1 | BL 0001 | AL 0001 | BL 0010 | BL 0010 | BL 00010 |
| 0 0 1 0 0 0 | AU 0010 | BU 0010 | BU 0011 | BU 0011 | BU 00011 |
| 0 0 1 0 0 1 | AL 0010 | BL 0010 | BL 0011 | BL 0011 | BL 00011 |
| 0 0 1 0 1 0 | BU 0010 | BU 0011 | AU 0001 | BU 0100 | BU 00100 |
| 0 0 1 0 1 1 | BL 0010 | BL 0011 | AL 0001 | BL 0100 | BL 00100 |
| 0 0 1 1 0 0 | AU 0011 | AU 0010 | BU 0100 | BU 0101 | BU 00101 |
| 0 0 1 1 0 1 | AL 0011 | AL 0010 | BL 0100 | BL 0101 | BL 00101 |
| 0 0 1 1 1 0 | BU 0011 | BU 0100 | BU 0101 | BU 0110 | BU 00110 |
| 0 0 1 1 1 1 | BL 0011 | BL 0100 | BL 0101 | BL 0110 | BL 00110 |
| 0 1 0 0 0 0 | AU 0100 | BU 0101 | BU 0110 | BU 0111 | BU 00111 |
| 0 1 0 0 0 1 | AL 0100 | BL 0101 | BL 0110 | BL 0111 | BL 00111 |
| 0 1 0 0 1 0 | BU 0100 | AU 0011 | BU 0111 | AU 0001 | BU 01000 |
| 0 1 0 0 1 1 | BL 0100 | AL 0011 | BL 0111 | AL 0001 | BL 01000 |
| 0 1 0 1 0 0 | AU 0101 | BU 0110 | AU 0010 | BU 1000 | BU 01001 |
| 0 1 0 1 0 1 | AL 0101 | BL 0110 | AL 0010 | BL 1000 | BL 01001 |
| 0 1 0 1 1 0 | BU 0101 | BU 0111 | BU 1000 | BU 1001 | BU 01010 |
| 0 1 0 1 1 1 | BL 0101 | BL 0111 | BL 1000 | BL 1001 | BL 01010 |
| 0 1 1 0 0 0 | AU 0110 | AU 0100 | BU 1001 | BU 1010 | BU 01011 |
| 0 1 1 0 0 1 | AL 0110 | AL 0100 | BL 1001 | BL 1010 | BL 01011 |
| 0 1 1 0 1 0 | BU 0110 | BU 1000 | BU 1010 | BU 1011 | BU 01100 |
| 0 1 1 0 1 1 | BL 0110 | BL 1000 | BL 1010 | BL 1011 | BL 01100 |
| 0 1 1 1 0 0 | AU 0111 | BU 1001 | BU 1011 | BU 1100 | BU 01101 |
| 0 1 1 1 0 1 | AL 0111 | BL 1001 | BL 1011 | BL 1100 | BL 01101 |
| 0 1 1 1 1 0 | BU 0111 | AU 0101 | AU 0011 | BU 1101 | BU 01110 |
| 0 1 1 1 1 1 | BL 0111 | AL 0101 | AL 0011 | BL 1101 | BL 01110 |
| 1 0 0 0 0 0 | AU 1000 | BU 1010 | BU 1100 | BU 1110 | BU 01111 |
| 1 0 0 0 0 1 | AL 1000 | BL 1010 | BL 1100 | BL 1110 | BL 01111 |
| 1 0 0 0 1 0 | BU 1000 | BU 1011 | BU 1101 | BU 1111 | AU 00001 |
| 1 0 0 0 1 1 | BL 1000 | BL 1011 | BL 1101 | BL 1111 | AL 00001 |
| 1 0 0 1 0 0 | AU 1001 | AU 0110 | BU 1110 | AU 0010 | BU 10000 |
| 1 0 0 1 0 1 | AL 1001 | AL 0110 | BL 1110 | AL 0010 | BL 10000 |

FIG. 7

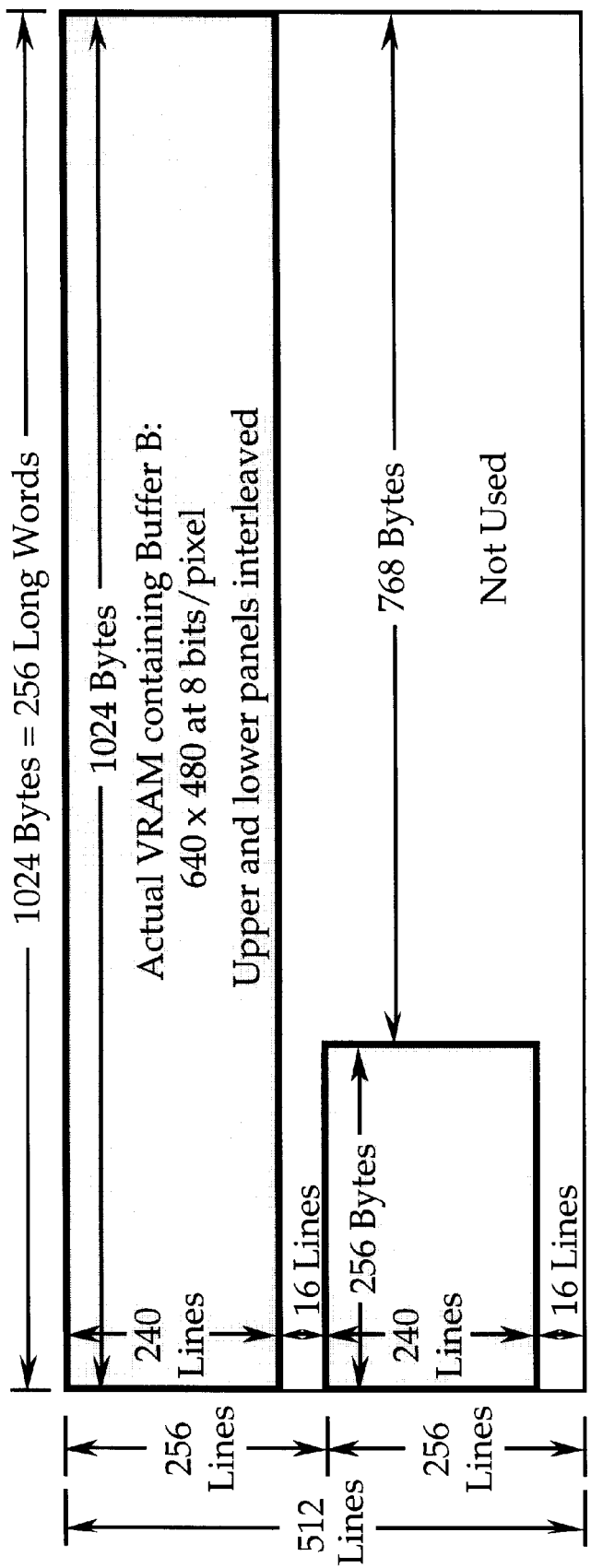
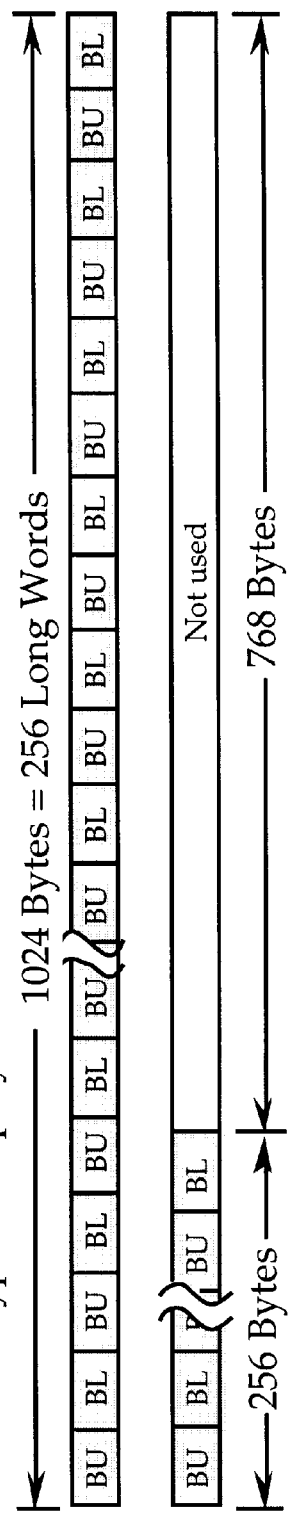
FIG. 8B

MULTI-PANEL VIDEO DISPLAY CONTROL ADDRESSING OF INTERLEAVED FRAME BUFFERS VIA CPU ADDRESS CONVERSION

The present invention is related to co-pending U.S. patent application entitled "A Method And Apparatus For Interleaving Display Buffers", Ser. No. 08/315,653, assigned to the assignee of the present invention.

This invention relates generally to a processor-controlled system such as a computer system and, more particularly, but not exclusively, to an electrical arrangement in the system for displaying information on associated multi-panel display monitor(s).

There is a large variety of display devices available in the market today especially for computer users. Typically, they are single-paneled but some of them, for example, some liquid crystal displays are multi-paneled, for example, dual-paneled in that such a display is really two display screens in one, the first display screen occupying the top half of the combined viewing area, and the other screen occupying the bottom half. To refresh images for a dual-panel display, data must be sent to both the upper and lower display screens simultaneously.

Regardless, many image resolutions are available for these dual-panel computer displays. A common resolution for these computer displays is 640×480. Such resolution for a dual-panel display refers to a display having an overall screen measuring 640 pixels wide by 480 lines high, typically occupying 240 lines in each panel. But frame buffer memory servicing this display at typical bit-per-pixel rates fits very inefficiently into any standard sizes of memory components, leaving large amounts of memory unused. But for those systems operatively requiring additional frame buffers, this memory management inefficiency could be cured by storing more than one frame buffer into a single physical memory system. For example, referring to the frame buffer and memory size tables shown in FIGS. 1A and 1B, a 640×480 display at 16 bits per pixel requires 614,400 bytes to store its data, but the smallest memory size available for such a frame buffer is 1,048,576 bytes. This leaves 434,176 bytes of memory unused, enough to store a second 640×480 frame buffer at 8 bits per pixel. FIG. 2 illustrates typical memory size requirements for storing both frame buffers for a 640×480 display.

Processor-controlled systems having a multi-panel display often have needs for more than one frame buffer in order to store additional image information from sources such as live TV video and a pen input device overlaying (or underlaying) such external images onto the normal display image. Additional frame buffers are also used in systems where there are at least two different image displays, e.g., a built-in LCD display and an external CRT monitor.

It would be desirable and therefore an object for the present invention to store multiple overlaying images in a single memory system, e.g., a VRAM, or a DRAM system, where the multiple sets of image data are to be accessed "simultaneously" in a data stream from that memory so as to serve a multi-panel display system. VRAM is dual-ported in that image data used to refresh the display(s) is clocked out of one data port while the processor updates the image data through another port of the VRAM. On the other hand, image data in DRAM is accessed for refresh and updates via a single port. In fact, the embodiments disclosed hereinafter are better adapted for VRAM usage but the invention can be easily re-configured by an artisan to use other types of memory including DRAM. It is another object of the invention to provide for a dual-panel display system wherein a first frame buffer is stored in a memory system and wherein a second frame buffer to be overlaid onto the display image is stored in the same memory system using previously wasted memory cells; it is yet a further object for said dual-panel display system to concurrently display images from both frame buffers onto separate displays. A further object is to provide a method and an apparatus for addressing multiple logical frame buffers in a single memory system for use by dual-panel displays.

Unlike the single-frame buffer mode in the prior art where the frame buffer is accessed via one CPU-driven Frame-buffer Select signal, e.g., FS0, one aspect of the present invention discloses a two-frame buffer mode operating using a single memory system wherein each frame buffer is accessed by one of a pair of CPU-driven Frame-buffer Select signals, e.g., FS0 and FS1. FS0 is a signal typically dependent on the high-order bits of the CPU address. Its assertion indicates a CPU access in the address range corresponding to the stored image data. Similarly, the assertion of FS1 indicates a CPU access in the address range corresponding to the stored data for a second frame buffer. FS0 and FS1 may be generated by external logic or from within a video display controller. Another aspect of the present invention includes an arrangement for manipulating the addressing of the memory system on data reads and writes, the two frame buffers are made to appear individually separate and distinct to software, but the image data from the two logical frame buffers are distributed uniformly throughout the physical memory so the streams of data from the two logical frame buffers arrive correctly interleaved when accessed sequentially by the video display controller. The video display controller functions as a memory address controller that takes in a contiguous range of CPU addresses used for accessing the logical frame buffers and converts those addresses to the interleaved memory addresses for accessing the physical memory. In addition, it includes logic for processing video data for the display system.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1A is a table listing frame buffer size requirements for a 640×480 display at varying bit-per-pixel rates;

FIG. 1B is a table listing common VRAM memory sizes;

FIG. 2 is a table illustrating memory requirements for storing two 640×480 frame buffers at varying bit-per-pixel rates;

FIG. 7 is a partial VRAM and CPU address table for embodiments in accordance with the present invention in which the bit-per-pixel ratios between the two frame buffers is a parameter;

FIG. 8B illustrates how the frame buffer B of FIG. 8A is physically stored in the memory and how the image data for the upper and lower panels of a dual-panel display are interleaved in a frame buffer B data stream being delivered to the video display controller of FIG. 3;

DESCRIPTION OF EMBODIMENTS

A novel method and apparatus are described for arranging two logical frame buffers into a single memory system for multi-panel display operations of a computer. The particular electronic implementation of the present invention should not be seen as limiting because the present invention may be suitable for use in any electronically controlled system requiring the use of at least two logical frame buffers for display operations. Throughout this detailed description numerous details are set forth in order to provide a thorough understanding of the present invention, for example, multiple references are made to specific data word bit-widths of communication lines. These specific values are exemplary only. To one skilled in the art, however, it will be appreciated that the present invention may be practiced without such specific details and that a wide range of data-word-bit-width values can be used within the scope of the present invention. In other instances, well-known methods, procedures, control structures and gate level circuits have not been shown in detail in order not to obscure the present invention.

With today's device technology, the development of specialized integrated circuits and programmable logic generally do not require the rendering of fully detailed circuit diagrams. The definition of logic functionality allow computer design techniques to design the desired logic and circuits. Additionally, microcontrollers are known to operate based on a desired flow diagram rendered into software that is compatible with a selected microcontroller. Accordingly, portions of the present invention will be described primarily in terms of functionality to be implemented by a microcontroller and other associated electronic components. This functionality will be described and those of ordinary skill in the art, once given the following descriptions of the various functions to be carried out by the present invention will be able to implement the necessary microcontroller structure and logic for various logic devices or custom designed integrated circuits in suitable technologies without undue experimentation.

Figure 3:
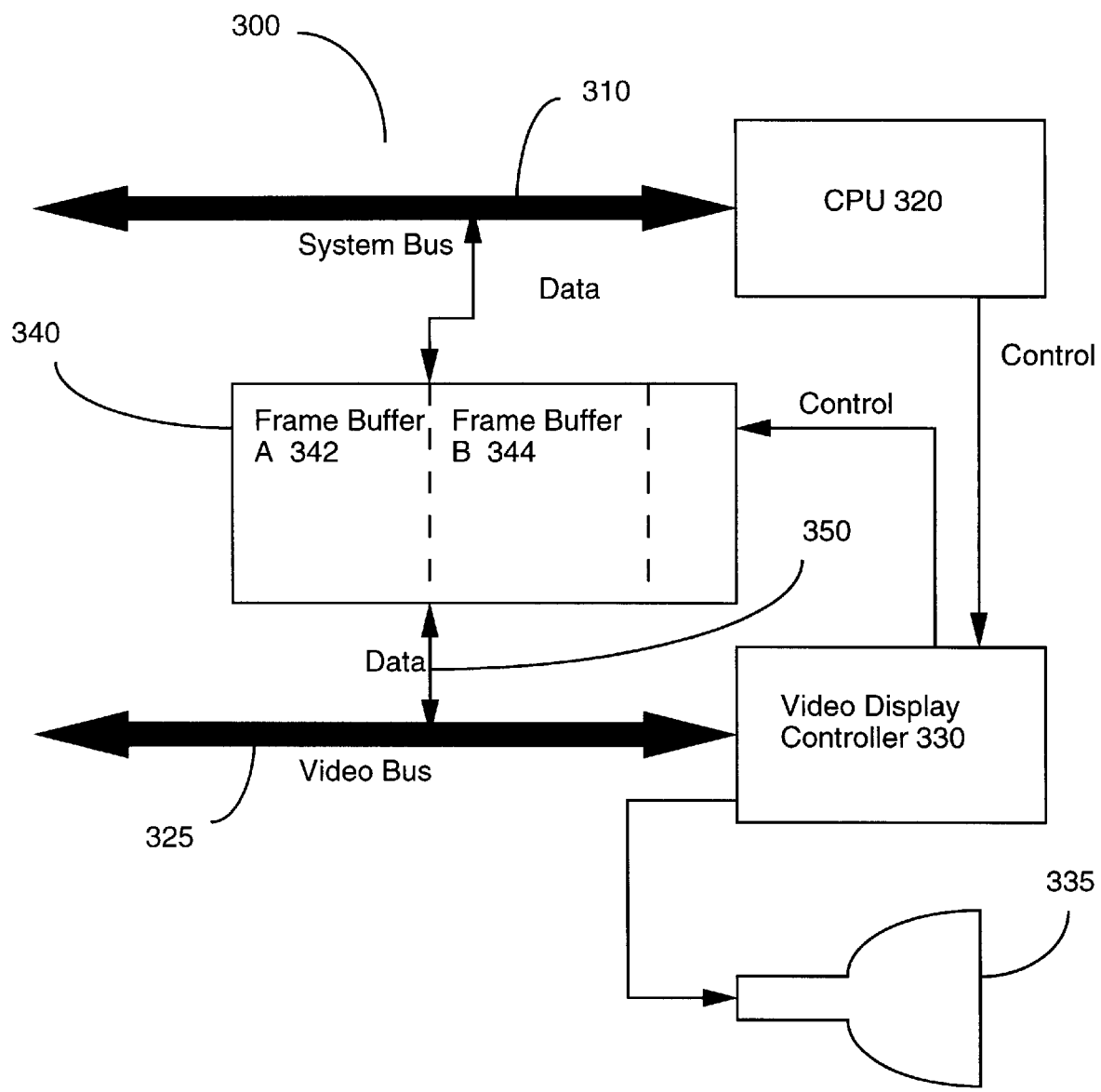
FIG. 3 is a functional diagram illustrating a partial computer system in accordance with the present invention wherein logical frame buffers A and B reside in a single physical memory system.

FIG. 3 is a block diagram illustrating a partial computer system 300 in accordance with the present invention. This computer system 300 comprises a system bus 310 and a video bus 325 for carrying information, a CPU 320 coupled to the system bus 310 for processing information and instructions, a video display controller 330 coupled to the video bus 325 for processing image information and for directing the processed image information to an associated dual-panel display 335, and moreover two logical frame buffers A and B 342, 344 both being operatively stored in a single memory 340. This memory 340 is coupled singly to the system bus 310 and the video bus 325 for receiving and dispatching image information, and coupled to the video display controller 330 for receiving control signals, and being further coupled to the video display controller 330 via a sequential, multiple-bit line 350. A preferred line bit-width for the memory 340 is 32 bits for carrying a four-byte word worth of information per data clock cycle. The dual-panel display 335 (panels not shown) utilized with the computer system 300 may be a liquid crystal device or other display devices suitable for creating graphic images and alphanumeric characters recognizable to the user. In fact, the dual-panel display 335 is generic in that it could represent more than one display.

Figure 4A:
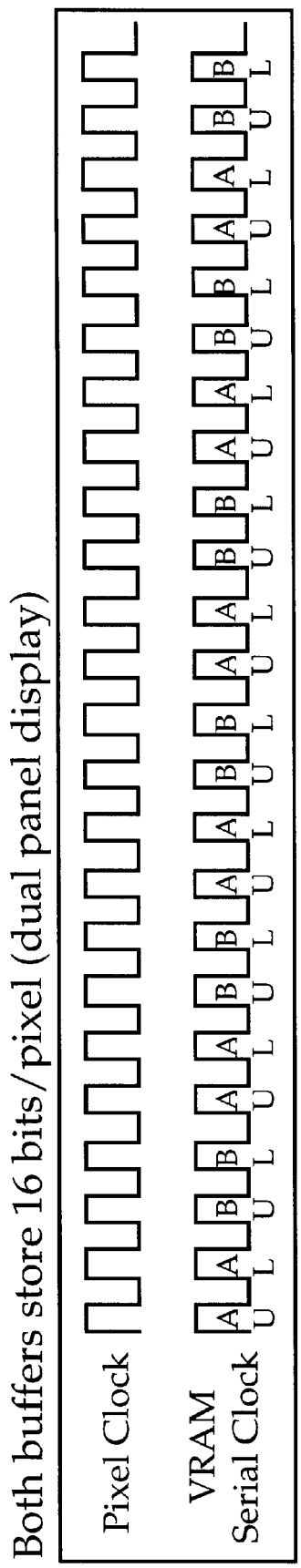
FIG. 4A is a timing diagram illustrating how a pixel clock signal for the display(s) relates to the timing at which the four data portions, AU, AL, BU and BL are delivered over a 32-bit bus to the video display controller of FIG. 3 for an embodiment having both frame buffers A and B of FIG. 3 operatively stored at 16-bit-per-pixel rate.
Figure 4B:
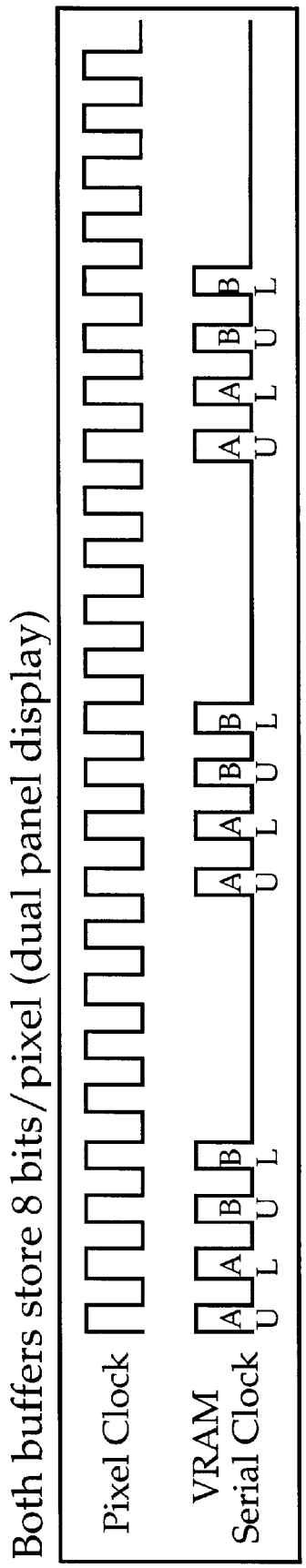
FIG. 4B is a timing diagram illustrating how a pixel clock signal for the display(s) relates to the timing at which the four data portions, AU, AL, BU and BL are delivered over a 32-bit bus to the video display controller of FIG. 3 for an embodiment having both frame buffers A and B of FIG. 3 operatively stored at 8-bit-per-pixel rate.

In accordance with one aspect of the present invention, the frame buffer A 342 and the frame buffer B 344 appear as two logical buffers to software, e.g., one for the normal display image and one for the overlay image. But each of the frame buffers 342, 344 is divided into two data portions in the video display controller 330, one data portion for one of the dual panels, e.g., the upper panel, and the other data portion for the other of the dual panels, e.g., the lower panel. Therefore, for the two frame buffers 342, 344, in all there are four data portions interleaved in the memory 340. Once the interleaved image data is received by the video display controller 330 via the video bus 325, the interleaved data stream is then separated into four separate data streams each corresponding to one of the four data portions. For example, FIGS. 4A and 4B show the two data portions for the frame buffer A 342 are designated as AU (frame buffer A—upper panel) and AL (frame buffer A—lower panel) and the two portions for the frame buffer B 344 are BU and BL. Given a 32-bit video bus, FIGS. 4A and 4B illustrate how AU, AL, BU and BL are interleaved and sequentially clocked out of the memory 340 when both frame buffers 342, 344 contain data operatively stored at the same bit-per-pixel rates. For FIG. 4A, the rate is 16 bits per pixel and it is 8 bits per pixel for FIG. 4B. In this embodiment, the interleaved data portions AU, AL, BU, and BL are stored in the memory 340 having the same positional order as they are sequentially clocked out of the memory 340. FIGS. 4A and 4B further indicate a 32-bit data word containing AU and a 32-bit data word of AL is to be followed by a 32-bit word of BU and another containing BL. Other ordering of these data portions could be used, for example, the order of AU, BU, AL, BL would allow the earliest comparison of data from both frame buffers 342, 344 by the video display controller 330; however, the order shown in FIG. 4A and 4B offer the simplest address transformation calculations. Also, because depending on the frame buffer's bit-per-pixel rate, each 32-bit data word may contain more than one pixel of the designated data portion; therefore, as shown in FIG. 4A where both frame buffers 342, 344 storing data at a 16-bit-per-pixel or a 2-pixel-per-word rate, the 32-bit video bus must be clocked at the full pixel clock rate (the rate at which pixel data is presented to the display panels, i.e., one clock for an upper panel pixel, followed by one clock for a lower panel pixel, etc.) so as to provide two pixels from each of the two display panels in each of the two frame buffers 342, 344. But when the frame buffers 342, 344 both store data at an 8-bit-per-pixel rate, then as shown in FIG. 4B, the memory output data pulses would occur at half the frequency as needed for the 16-bit-per-pixel embodiment. Moreover, if frame buffers store 4, 2 or 1 bit per pixel data, then the memory output pulses for data portions, AU, AL, BU, BL, would occur correspondingly less often.

Once the data portions are received by the video display controller 330, one embodiment provides that two of the data portions, AU and BU or AL and BL, from the frame buffers 342, 344 destined for the same panel of the display 335 e.g., the upper or the lower panel, are compared one pixel's worth at a time; and for each comparison, one pixel is resultingly sent on to the remainder of the video system. In another embodiment where more than one display is utilized in the computer system 300 and each of the data portions, AU, AL, BU or BL, has a corresponding set of unique pixel positions on the displays, in this case, the video display controller 330 processes and separates the data portions and directs each of them to its unique pixel positions for display usage.

Figure 5A:
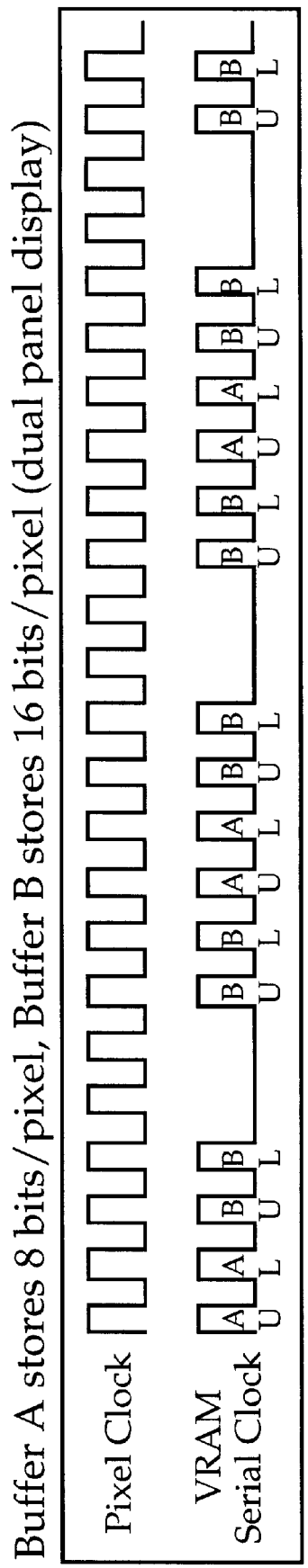
FIG. 5A is a timing diagram illustrating how a pixel clock signal for the display(s) relates to the timing at which the four data portions, AU, AL, BU and BL are delivered over a 32-bit bus to the video display controller of FIG. 3 for an embodiment having an 8-bit-per-pixel frame buffer A (FIG. 3) and a 16-bit-per-pixel frame buffer B (FIG. 3)
Figure 5B:
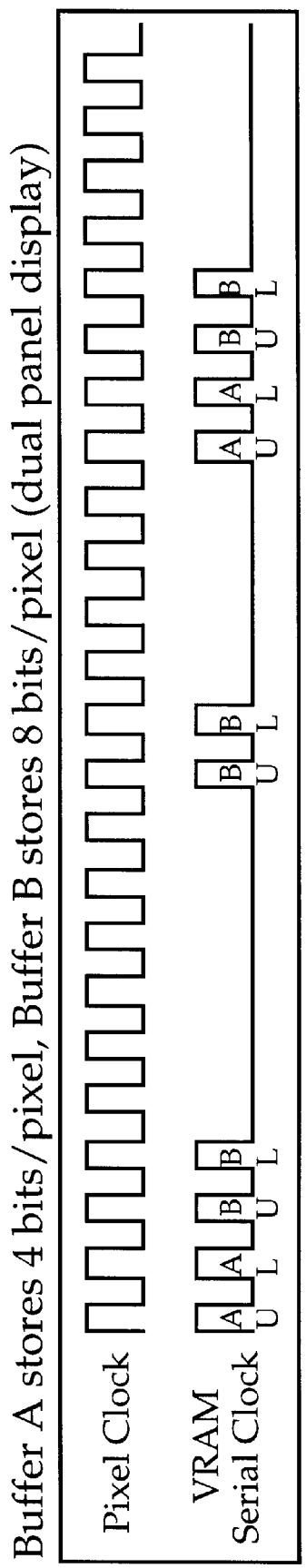
FIG. 5B is a timing diagram illustrating how a pixel clock signal for the display(s) relates to the timing at which the four data portions, AU, AL, BU and BL are delivered over a 32-bit bus to the video display controller of FIG. 3 for an embodiment having an 4-bit-per-pixel frame buffer A (FIG. 3) and a 8-bit-per-pixel frame buffer B (FIG. 3)

FIGS. 5A and 5B illustrate another aspect of the invention where the frame buffer A 342 stores data at ½ the bit-per-pixel rate of the frame buffer B 344. Using image data from each frame buffer at the same pixel rate means that the video display controller 330 receives and uses the image data from the frame buffer A 342 at ½ the rate from the frame buffer B 344. In other words, the video display controller 330 receives data from the frame buffer A 342 in two 32-bit data words out of six and receives data from the frame buffer B 344 in the other four of the six data words. Since the display is dual-paneled, the video display controller 330 breaks the incoming data stream into four data streams according to the order selected for the data portions. As shown in FIGS. 5A and 5B, the less frequent AU and AL data pulses interleave among the more frequent data pulses for BU and BL. For FIG. 5A, data pulses of the 16-bit-per-pixel frame buffer B 344 for the 32-bit video bus 325 are clocked out twice for every four display pixels (once for BU and once for BL), and the data pulses for the 8-bit-per-pixel frame buffer A 342 occur twice for every eight display pixels (once for AU and once for AL). Similarly, for FIG. 5B, data pulses from the 8-bit-per-pixel frame buffer B 344 occur twice for every eight pixel clock cycles, while occurring twice every sixteen pixel clock cycles for the data pulses from the 4-bit-per-pixel frame buffer A 342. This principle could be extended to cases when data of the frame buffer A 342 is operatively stored at ¼, ⅛ and 1/16 the bit-per-pixel rate of the frame buffer B 344. For example, FIG. 6 illustrates the case where data from the 4-bit-per-pixel frame buffer A 342 is clocked out of the memory 340 in two 32-bit data words out of ten, while data from the 16-bit-per-pixel frame buffer B 344 shifts out in the remaining eight of ten 32-bit data words.

Figure 6:
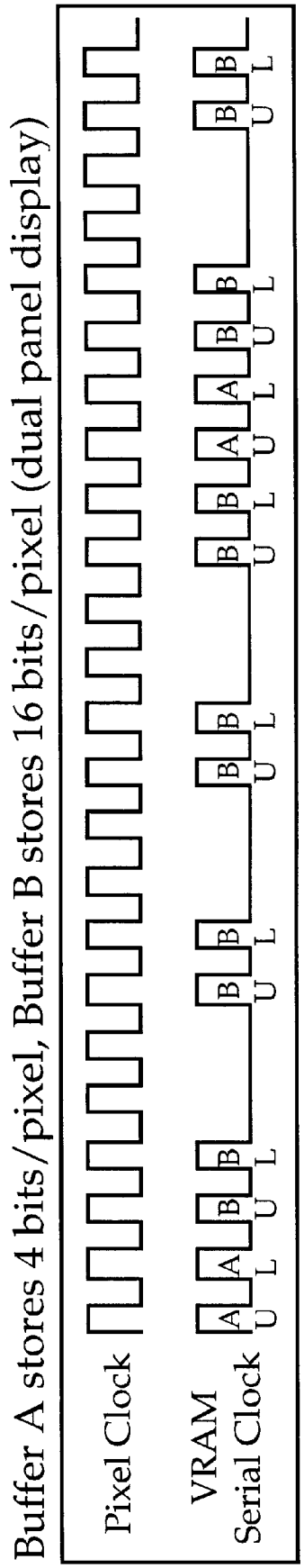
FIG. 6 is a timing diagram illustrating how a pixel clock signal for the display(s) relates to the timing at which the four data portions, AU, AL, BU and BL are delivered over a 32-bit bus to the video display controller of FIG. 3 for an embodiment having an 4-bit-per-pixel frame buffer A (FIG. 3) and a 16-bit-per-pixel frame buffer B (FIG. 3)

Because the two frame buffers 342, 344 are physically stored into a single memory system 340, the CPU access of these frame buffers 342, 344 must be adapted for passing those addresses to the memory 340 so the image data stored can be shifted out sequentially in the manner illustrated by FIGS. 5A, 5B, and 6. But because the upper panel and the lower panel of a dual-panel display are accessed and refreshed simultaneously, it would therefore also be advantageous for quick access to arrange the image data addressing such that upper and lower panel image data for each frame buffer are sequentially read out of the memory 340. One embodiment, for example, first leaves CPU addresses for the upper panel unchanged and then aligns the CPU addresses for the lower panel to those of the upper panel by applying either of the following two equations:

aligned CPU addresses=lower panel CPU addresses$-(AU_{max}+1)$ or aligned CPU addresses=lower panel CPU addresses$-(AL_{min})$ because $AU_{max}+1=AL_{min}$ where $AU_{max}$ is the CPU address for the last word of the upper panel data and $AL_{min}$ is the CPU address for the first word of the lower panel data.

The resulting CPU addresses would then undergo further transformation so as to allow sequential access of the data stored in the memory 340. FIG. 7 is an address table illustrating the least significant column bits of the memory addresses to be accessed in sequence by the input port of the video display controller 330, and the appropriate least significant bits of the aligned CPU addresses used by software to access the frame buffer data stored at those memory addresses. For the multi-bit line 350, CPU address bits A1-0 (not shown) are typically used as byte address bits within a 32-bit word. Each column in FIG. 7 shows the addressing mapping for various bit-per-pixel ratios between the frame buffer A 342 and that of the frame buffer B 344.

In general, if the bit-per-pixel rate of the data stored in the frame buffer B 344 is n times that of the frame buffer A 342, and data from the frame buffer A 342, AU and AL, are placed into the data stream first, then the following transformation must be done to each aligned CPU address (excluding, of course, the byte address bits, e.g., A1-0) so as to generate interleaved VRAM addresses for frame buffer access:

For accessing data portion AU:
VRAM address=2 (CPU address)+2 n (CPU address);

For accessing data portion AL:
VRAM address=2 (aligned CPU address)+2 n (aligned CPU address)+1;

For accessing data portion BU:
VRAM address=2 (CPU address)+2 (CPU address DIV n)+2; and For accessing data portion BL:
VRAM address=2 (aligned CPU address)+2 (aligned CPU address DIV n)+3 where address DIV n is equivalent to shifting the address right y bit positions, where 2y=n, which removes y least significant bits from where n, x and y are positive integers.

Figure 8A:
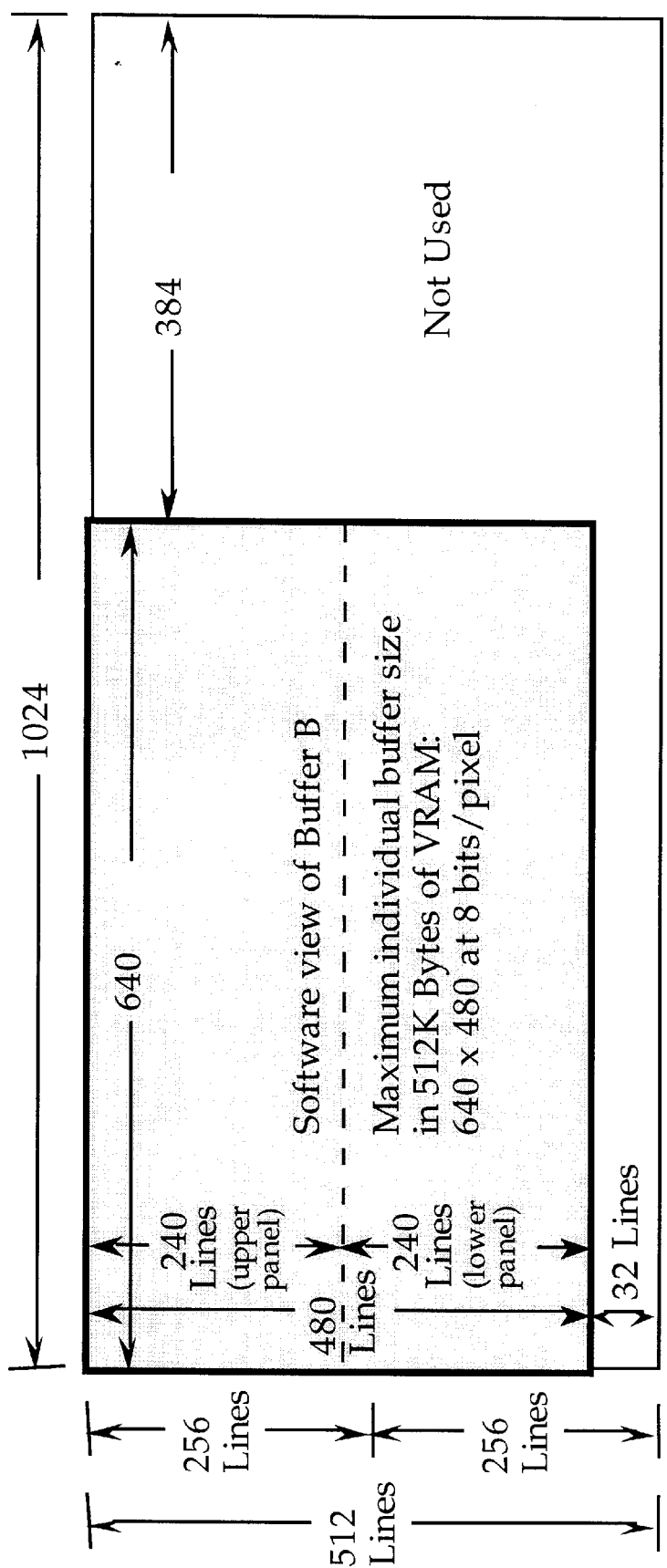
FIG. 8A illustrates how an 8-bit-per-pixel frame buffer B of FIG. 3 with trailing unused memory bytes for a 640×480 display is viewed by software.

Instead of storing data in the memory in a strictly sequential manner, one could take advantage of the fact that software can define a frame buffer in memory as a series of bytes storing the data for the first horizontal line of the display, followed by a fixed gap of unused bytes, and continuing on to the next row by another series of bytes for the next line of the display, then another gap of unused bytes, and so on. For a 640×480 display, this makes a frame buffer of 480 lines, each containing the number of bytes needed to store the data for 640 pixels plus a fixed number of unused gap bytes. In practice, using the minimum memory size needed to store the data for a 640×480 display at any given number of bit-per-pixel rate typically leaves sufficient excess memory to make the number of bytes per line (i.e., pixel bytes plus gap bytes) equal to the nearest power-of-two bytes that is larger than the pixel bytes alone. For example, it takes 307,200 bytes to store the data for a 640×480 display at 8 bits per pixel, 480 lines of 640 bytes each. The minimum memory size needed to store this data is 512K bytes (See FIGS. 1A, 1B). As shown in FIG. 8A, it is possible to define the frame buffer B as 480 lines of 1024 bytes each (1024 is the next power of 2 greater than 640), with a gap of 384 unused bytes at the end of each line of display data. FIG. 8A also shows the software view of the frame buffer with the top half going to the upper panel and the bottom half going to the lower panel. But the data of this single frame buffer B for a dual display is physically stored in an interleaved manner as shown in FIG. 8B. Similarly, FIGS. 9A and 9B illustrate how a 4-bit-per-pixel frame buffer A would be viewed by the software and would be physically stored in the memory.

Figure 9A:
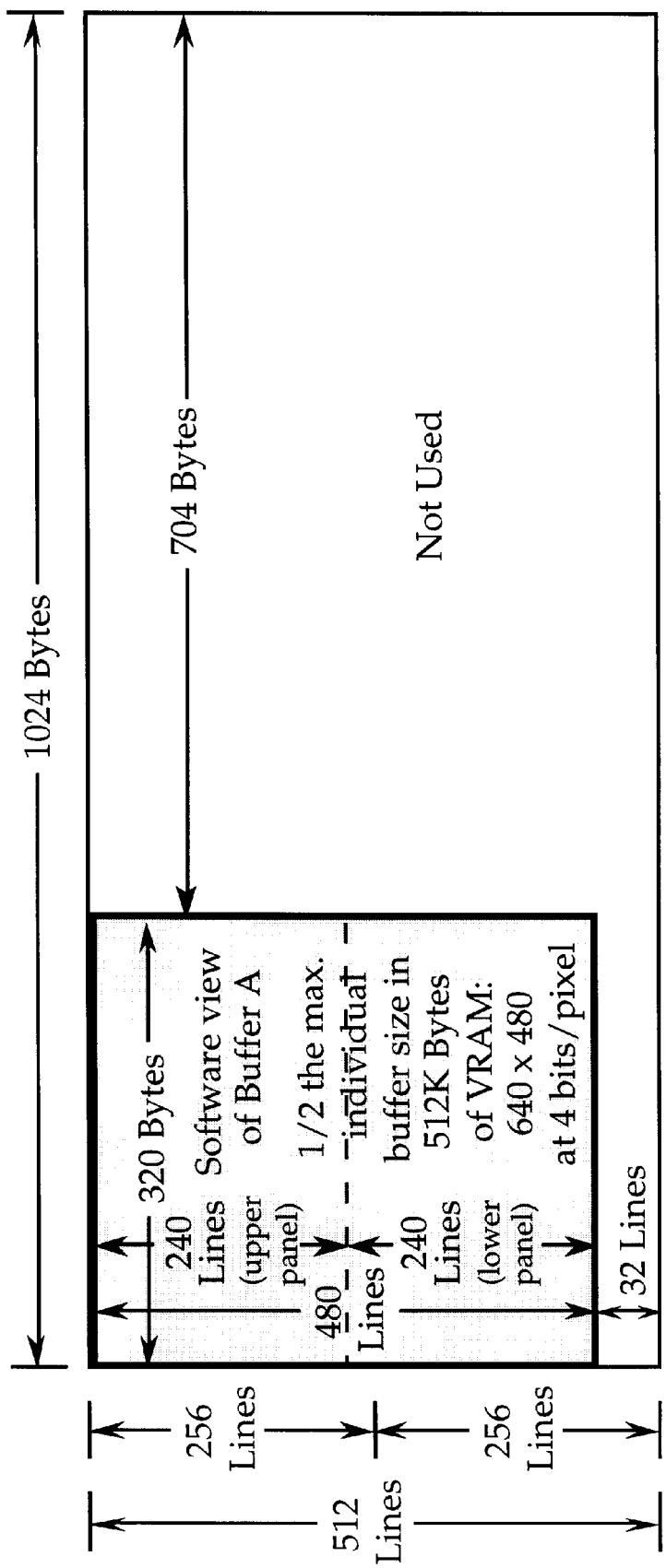
FIG. 9A illustrates how a 4-bit-per-pixel frame buffer A of FIG. 3 with trailing unused bytes for a 640×480 display is viewed by software.
Figure 9B:
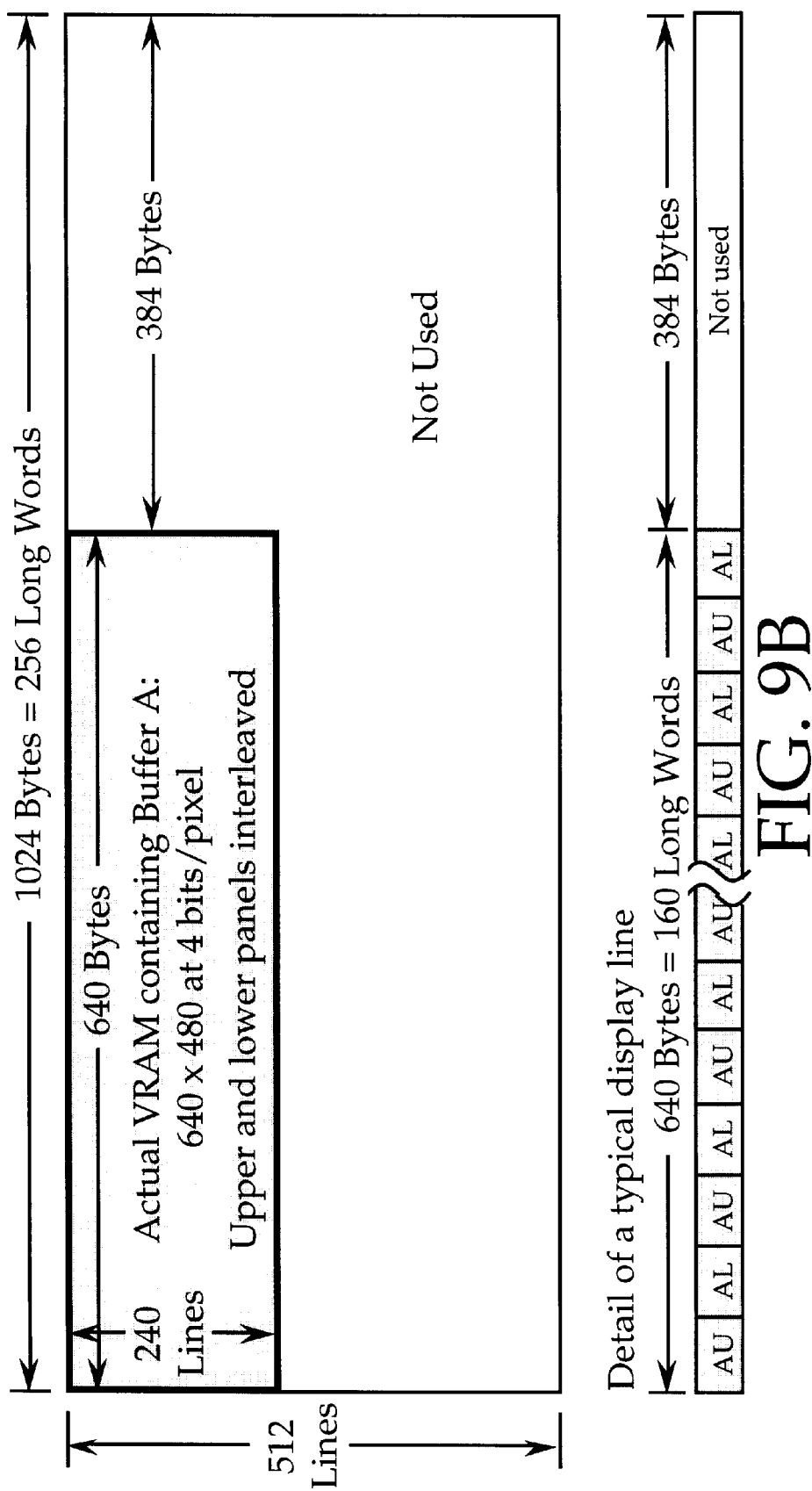
FIG. 9B illustrates how the frame buffer A of FIG. 9A is physically stored in the memory and how the image data for the upper and lower panels of a dual-panel display are interleaved in a frame buffer A data stream being delivered to the video display controller of FIG. 3.
Figure 10:
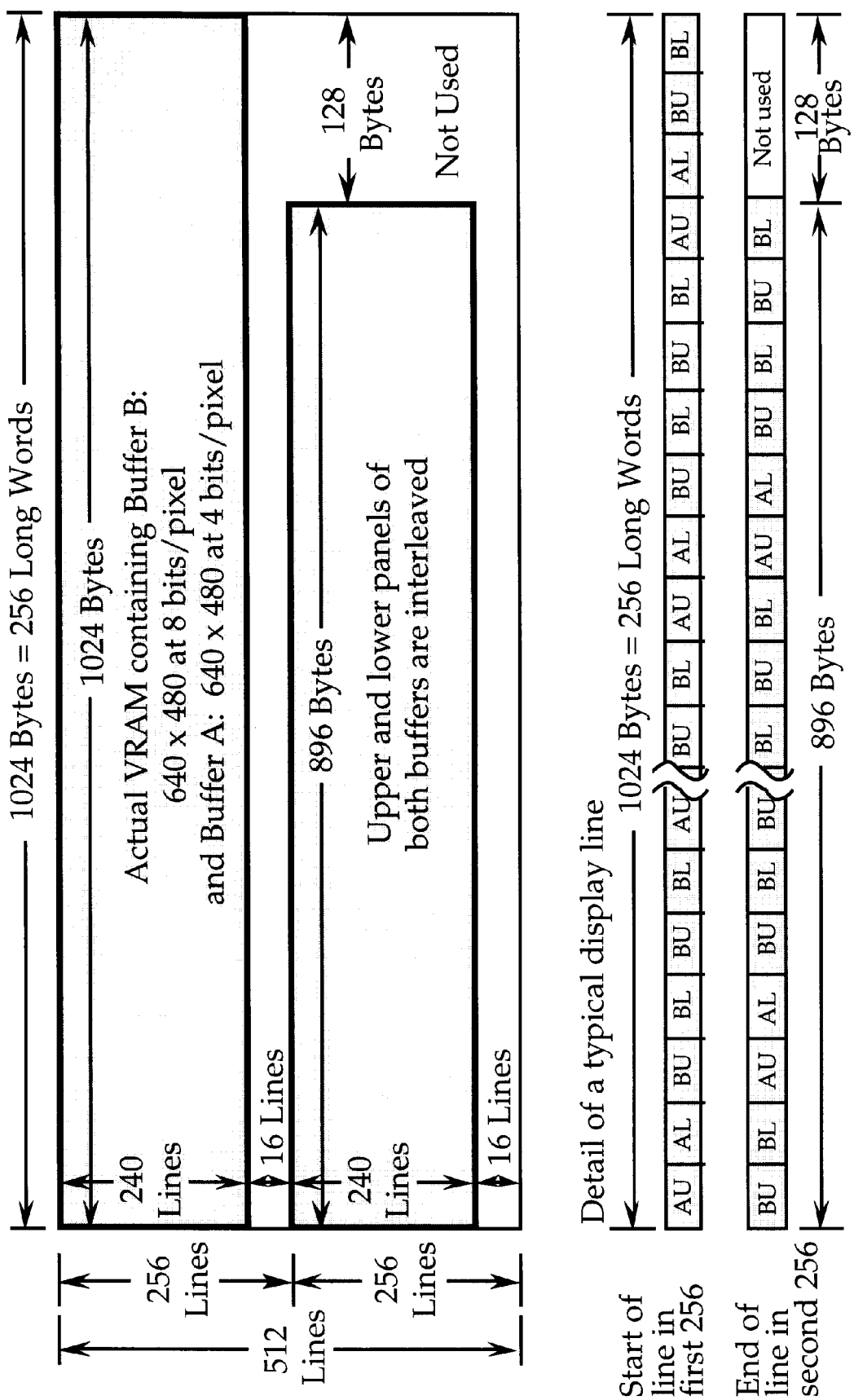
FIG. 10 illustrates how frame buffers in FIGS. 8B and 9B are interleaved in an embodiment in accordance with the present invention and illustrates a word-by-word diagram of a data stream of the frame buffers being delivered to the video display controller of FIG. 3.

Therefore, another preferred embodiment is provided to interleave data bytes of the frame buffers in FIGS. 8 and 9 only within a given horizontal display line. In other words, as shown in FIG. 10, this is effectively storing a line of second frame buffer's data in the unused gap bytes at the end of the corresponding data line of the first frame buffer on a line-by-line basis. Although the software continues to view the two frame buffers as illustrated in FIGS. 8A and 9A, the interleaved image data for the two frame buffers is actually physically stored as shown in FIG. 10. An advantage of this embodiment is that the conversion of each CPU address to a VRAM address involves only simple binary transformation (shifts and additions). The simplicity of the transformation necessary is important because every calculation used in determining the VRAM's address delays access to the VRAM, and therefore adversely affects overall performance of the display system.

Therefore, for a preferred embodiment having two frame buffers as described in FIGS. 8A and 9A which are physically stored in a memory system consisting of VRAM chips addressed by R bits of row address and C bits of column address and interleaved for use by a dual-panel display wherein the bit-per-pixel rate of the frame buffer B is n times that of the frame buffer A and wherein, R and C are positive integers following address transformation should be applied to the portions of the CPU addresses that constitute the R bits of row address and the C bits of column address software uses to access the logical frame buffer:

For accesses to data portion AU:
VRAM Column Address =      C LSB's of {
                           2 (CPU Column Address) +
                           2 n (CPU Column Address) };
For accesses to data portion AL:
VRAM Column Address =      C LSB's of {
                           2 (CPU Column Address) +
                           2 n (CPU Column Address) + 1 };
For accesses to data portion BU:
VRAM Column Address =      C LSB's of {
                           2 (CPU Column Address) +
                           2 (CPU Column Address DIV
                           n) + 2 };
For accesses to data portion BL:
VRAM Column Address =      C LSB's of {
                           2 (CPU Column Address) +
                           2 (CPU Column Address DIV
                           n) + 3 };

For all accesses to either data portion AU or data portion BU:
VRAM Row Address = CPU Row Address + $2^{(R-1)}$ [the value of bit (C + 1) of VRAM Column Address];
For all accesses to either data portion AL or BL:
VRAM Row Address = aligned CPU Row Address +
     $2^{(R-1)}$ [the value of bit (C + 1) of VRAM
     Column Address]
where LSB's are the least significant bits and where
aligned CPU Row Address = lower panel CPU Row Address −
[(Row Address of AUmax) + 1]
where $AU_{max}$ is the CPU address for the last word of the upper panel data.

The above equations are specific to the two-frame-buffer embodiment described but variation for these equations could be found by artisans without undue experimentation for the case of more than two frame buffers in a single memory system and for various display resolutions and/or memory component configurations.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. An electronic system including a processor and a display system, said display system comprises:

a video bus for carrying image information;

a display means having multiple display panels for displaying images where each of the multiple display panels receives a portion of the image information;

a video display controller being coupled to the display means and to the video bus for receiving the image information and for processing the image information for use by said display means;

a plurality of logical frame buffers including a logical frame buffer A and a logical frame buffer B, said plurality of logical frame buffers containing the image information and information from each frame buffer being delivered over the video bus in an interleaved manner and in separate data words to the video display controller;

a memory system of sufficient size for storing the plurality of logical frame buffers, the memory system being coupled to the video bus for transferring the image information, the memory system is arranged such that the plurality of logical frame buffers are interleavably stored therein and such arrangement allows sequential image information output from said memory system for the simultaneous transfer of the image information from each frame buffer to the multiple display panels of the display means; and said multiple display panels including at least one upper panel and at least one lower panel, wherein the two logical frame buffers A and B each has an upper panel data portion and a lower panel data portion and wherein the video display controller is coupled to the processor and further includes an address generator for receiving CPU addresses for pixel positions of the upper or the lower panel from the processor and for responsively generating corresponding memory addresses for accessing the memory system, the address generator converting each CPU address into its memory address counterpart according the following formulae:

aligned CPU address=CPU address−$AL_{min}$;

where $AL_{min}$ is the CPU address for the first word of the lower panel data portion;

For accessing the upper panel data portion of the logical frame buffer A:
memory address=2 (CPU address)+2 n (CPU address);

For accessing the lower panel data portion of the logical frame buffer A:
memory address=2 (aligned CPU address)+2 n (aligned CPU address)+1;

For accessing the upper panel data portion of the logical frame buffer B:
memory address=2 (CPU address)+2 (CPU address DIV n)+2; and For accessing the lower panel data portion of the logical frame buffer B:
memory address=2 (aligned CPU address)+2 (aligned CPU address DIV n)+3 where address DIV n is equivalent to shifting the address right y bit positions, where $2_y$=n, which removes y least significant bits from the address where n, x and y are positive integers.

2. The electronic system of claim 1 wherein said display means includes two displays and wherein said video display controller separates image data of said two logical frame buffers received from the memory system into separate data streams and directs the data streams individually and separately to the two displays.

3. The computer system of claim 1 wherein said memory system includes DRAM.

4. The electronic system of claim 1 further comprises:
the logical frame buffer B having a bit-per-pixel rate n times that of the first logical frame buffer A, the two logical frame buffers each being configured to have an upper panel data portion and a lower panel data portion; and the video display controller being coupled to the processor and further includes an address generator for receiving CPU row and column addresses for pixel positions of the upper and the lower panel from the processor and for responsively generating corresponding memory addresses including R bits of row address and C bits of column address for accessing the logical frame buffers in the memory system for use by the display means; and the address generator converting each CPU address into its memory address counterpart according the following formulae where n, R and C are positive integers:

For accesses to data portion AU:
VRAM Column Address =  C LSB's of {
  2 (CPU Column Address) +
  2 n (CPU Column Address) };

For accesses to data portion AL:
VRAM Column Address =  C LSB's of {
  2 (CPU Column Address) +
  2 n (CPU Column Address) + 1 };

For accesses to data portion BU:
VRAM Column Address =  C LSB's of {
  2 (CPU Column Address) +
  2 (CPU Column Address DIV n) + 2 };

For accesses to data portion BL:
VRAM Column Address =  C LSB's of {
  2 (CPU Column Address) +
  2 (CPU Column Address DIV n) + 3 };

For all accesses to either data portion AU or data portion BU:
VRAM Row Address = CPU Row Address + $2^{(R-1)}$ [the value of bit (C + 1) of VRAM Column Address];

For all accesses to either data portion AL or BL:
VRAM Row Address = aligned CPU Row Address +
  $2^{(R-1)}$ [the value of bit (C + 1) of VRAM Column Address]

where LSB's are the least significant bits and where
aligned CPU Row Address = lower panel CPU Row Address − [(Row Address of AUmax) + 1]

where $AU_{max}$ is the CPU address for the last word of the upper panel data.

* * * * *